(12) United States Patent
Levy

(10) Patent No.: US 6,618,093 B1
(45) Date of Patent: Sep. 9, 2003

(54) DISTORTION-FREE IMAGING DEVICE HAVING CURVED PHOTOSENSOR

(76) Inventor: Chauncey F. Levy, 1299 Portland Ave., Rochester, NY (US) 14621

( * ) Notice: Subject to any disclaimer, the term of this patent is extended or adjusted under 35 U.S.C. 154(b) by 0 days.

(21) Appl. No.: 09/007,755

(22) Filed: Jan. 15, 1998

(51) Int. Cl.[7] ................................................. H04N 3/14
(52) U.S. Cl. ..................................................... 348/374
(58) Field of Search ................................. 348/374, 340, 348/335, 345, 241

(56) References Cited

U.S. PATENT DOCUMENTS

| | | | | |
|---|---|---|---|---|
| 4,423,438 A | * | 12/1983 | Nakamura | 348/374 |
| 4,626,918 A | * | 12/1986 | Morisawa | 358/225 |
| 5,498,868 A | * | 3/1996 | Nishikawa et al. | 250/234 |
| 6,097,361 A | * | 8/2000 | Rohner | 345/87 |
| 6,122,009 A | * | 9/2000 | Ueda | 348/374 |
| 6,285,400 B1 | * | 9/2001 | Hokari | 348/374 |

\* cited by examiner

*Primary Examiner*—Wendy R. Garber
*Assistant Examiner*—Rashawn N. Tillery
(74) *Attorney, Agent, or Firm*—Oblon, Spivak, McClelland, Maier & Neustadt, P.C.

(57) ABSTRACT

The present invention is directed to a distortion free imaging device having an imaging optical system that could be utilized for example in a video camera. In particular a camera configured according to the present invention reduces or eliminates the positive or pin cushion distortion that makes figures seem fatter than they really are. The imaging device includes a photosensor that is configured entirely along the contours of the posterior focal plane of the imaging optical system. The optical system can include a single or plurality of lens and can include a mirror.

20 Claims, 3 Drawing Sheets

DISTORTION-FREE IMAGING DEVICE HAVING CURVED PHOTOSENSOR

FIELD OF THE INVENTION

The present invention relates to imaging systems such as cameras. In particular, the present invention is directed to a camera configured to reduce or eliminate certain types of distortion.

BACKGROUND OF THE INVENTION

Imaging systems such as video cameras employing CCD's and other photosensitive devices are used in a large number of different applications. Such uses are often carried out in environments exhibiting extreme conditions so that a great deal of reliance must rest upon the traditional optical systems that are included as part of almost all video cameras. In many cases, the operation of an electronic imaging device is not feasible without the full benefits of an accompanying, high resolution optical system. Because of advances in optical technology, the optical system per se can usually be provided without creating distortion within the focal range of the optical system. Unfortunately, electronic imaging systems often operate beyond the normal focal range of the optical systems included therein.

Traditional optical systems have curved focal regions while most electronic photosensitive devices, such as CCD's, are manufactured on planar wafers. Traditional photosensitive chemical film is also arranged as a flat plane when taking either still or moving pictures. Thus, the interface between the optical system and the electronic photosensitive portion of a camera is far from perfect. This imperfect interface results in various types of distortion such as that caused by Petzval field curvature and positive or pincushion distortion that makes images appear fatter than they really are. Such effects also include lenticular aberrations, coma and astigmatism.

This distortion, when added to other sources of distortion, such as camera movement or changes in the optical system, due to the use of a wide angled lens, or extreme light variation, create difficulties in achieving clear, accurate images from any type of imaging system. This is further exacerbated if the video camera is being moved during it's use, or is otherwise subject to impact during it's use. These conditions are also problematical for traditional photosensitive chemical film cameras, but to a lesser extent.

The various types of distortion produced by electronic video cameras, especially those having electronic photosensor arrays, have been addressed in a number of ways as disclosed in a number of U.S. patents discussed below, each of which is incorporated herein by reference.

One approach is found in U.S. Pat. No. 5,489,940 to Richardson et al., which discloses a wide-angle lens producing a distorted wide-angle optical image. The electronic imaging sensor is constituted-by a plurality of imaging elements. These have a distribution on the surface of the sensor that is best described by a non-linear function. This distribution of the imaging elements corrects for the distortion in the wide-angle image. FIG. 10 of this patent depicts the arrangement of imaging sensors in the non-linear corrective pattern. However, this pattern does not fully match the optical characteristics of the lens system to the electronic sensor array in order to fully utilize the wide-angle lens, or to fully eliminate all distortion that occurs due to the discrepancy between the essentially flat electronic-image sensor and the curved focal area of the wide angle lens.

U.S. Pat. No. 5,497,191 to Yoo et al. discloses an image shake compensation circuit including a motion information detector for detecting motion information based on the occurrence of image shake when this occurs in an encoded video signal. The compensation circuit also includes a shake compensator for obtaining a start display position of the image of a present frame according to the motion information detected by the motion information detector. Also included is a decoder for decoding the encoded video signal to correct the display position of the image of the present frame in response to an output signal from the shake compensator.

U.S. Pat. No. 5,528,296 to Gove et al. discloses a graphics data unit for a digital television receiver. The graphics data unit uses a special light modulator, and has a graphics processor which offloads graphics processing tasks, such as that used for closed captioning and on-screen display. The graphics data unit also has a character memory unit, which stores fonts for closed-caption and on-screen display characters. A staggered pixel arrangement is used to compensate for distortion normally caused by standard pixel layouts for the spatial light modulator.

U.S. Pat. No. 5,552,828 to Perregaux discloses a scanner in which a set of photosensitive silicon chips are arranged together to form a single page-width array of photosensors. The photo sites along the critical ends of each chip are specially shaped to ensure even spacing of all photo-sites along the array, taking into account flaws in the dimensions of individual chips. The special shape of the end photo-site is trapezoidal or a variation of a trapezoid.

U.S. Pat. No. 3,833,762 to Gudmundsen discloses a solid state image motion compensation imager. This system uses a separate image speed sensor to control a motor which adjusts the position of the overall imaging sensor.

U.S. Pat. No. 5,179,428 to Lee discloses a three dimensional CCD image sensor including a plurality of N-type light-receiving regions formed on a two dimensional plane and a plurality of N type VCCD regions on a second two dimensional plane formed under the first plurality of regions.

U.S. Pat. No. 4,5745311 to Resnikoff et al. discloses a plurality of random array sensing devices. The sensor elements have their centers distributed on the surface of the substrate in a random, non-periodic pattern. The transfer members are coupled to the sensor elements and generate the output signal.

U.S. Pat. No. 5,460,341 to Katsuyama et al. discloses a disturbance compensation system for a camera that is mounted on a spacecraft. The system has an imaging device and condensing means for condensing light onto the imaging device. Linear actuators adjust the position of the imaging device by moving it in all directions appropriate. A control circuit computes, in response to position information associated with the imaging device, an amount by which the position of the imaging device should be corrected. The actuators that control movement of the imaging device are operated on the basis of the computed amount.

U.S. Pat. No. 5,218,442 to Hamada et al. discloses a camera with a shake detection apparatus. The camera operates so that light emitted by a subject which is passed through a photographic optical system is formed as an image on an area sensor. The system also includes an electronic view finder that indicates the image of the subject based on the output from the area sensor. An apparatus that detects image shaking caused by shaking of the camera is operated based on the output from the area sensor.

No combination of the teachings of the conventional art has suggested a technique for addressing the distortion caused by the interface between optical systems having curved focal areas and electronic photosensitive devices formed as flat planes. Consequently images derived from electronic cameras will always display a certain amount of distortion, especially at the periphery of the image captured by the imaging system.

SUMMARY OF THE INVENTION

Consequently it is an object of the present invention to increase resolution in video imaging and camera systems.

It is another object of the present invention to remove distortion caused by lenticular aberration, such as pin cushion distortion, coma and astigmatism, as well as any other effects of a Petzval field.

It is a further object of the present invention to optimize the reception and imaging of particular wavelengths of light in a video imaging system having an optical system.

It is a still another object of the present invention to reconcile discrepancies between circular optical lenses and rectangular display screens, thereby eliminating the peripheral effects found in conventional imaging systems.

These objects of the present invention, as well as the goals and advantages of the present invention, are achieved by an imaging device having an optical system with a posterior focal area. The imaging device also includes a photosensor configured to conform to and substantially occupy the posterior focal area of the optical system.

In another aspect of the present invention, the aforementioned goals are achieved by a method of compensating for distortion in an imaging system having an optical lens system and a photosensor. The method includes the steps of inputting a plurality of light rays to an area of the optical system. Then the light rays are refracted and transmitted to a plurality of photosensor devices located at a plurality of posterior focal points corresponding to the area of the optical system receiving the input light rays.

DETAILED DESCRIPTION OF THE PREFERRED EMBODIMENTS

Figure 1:
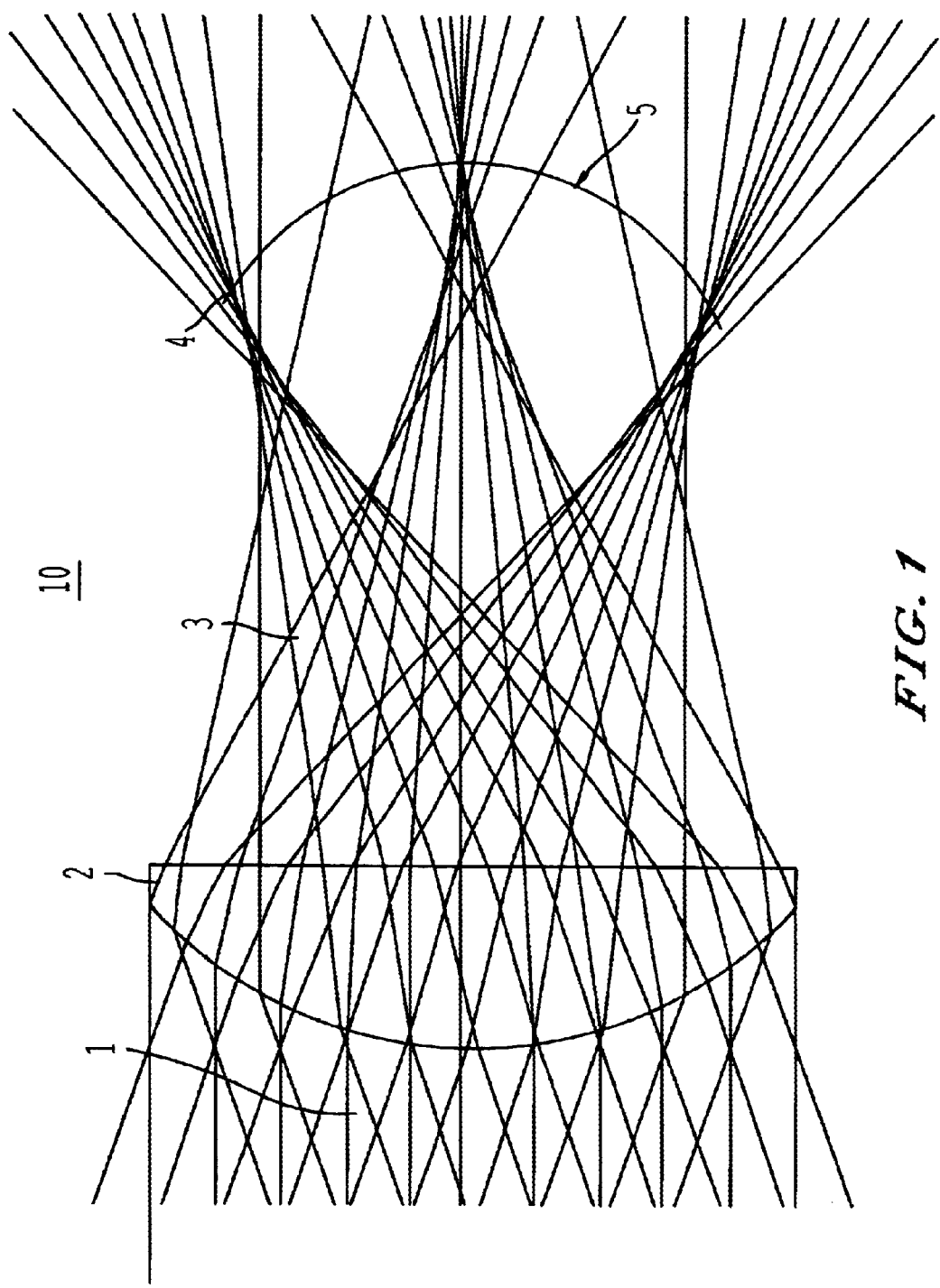
FIG. 1 is a schematic diagram depicting the arrangement of a device according to the present invention utilizing a lens system.

FIG. 1 depicts a basic imaging system encompassing the improvements of the present invention. The basic imaging system includes, like most imaging systems, an optical system as a first major part and schematically depicted as a converging lens 2, and a photosensor 5, as a second major part, optically spaced from lens 2. Photosensor 5 can be an array of discrete photosensitive devices, light sensitive liquid crystal devices (LCD's), one or a plurality of charged couple devices (CCD's), or a layer of light-sensitive chemical emulsion such as that utilized in traditional photographic film. When photosensor 5 is an electronic photosensitive device, conventional electrical connections (not shown, but obvious in view of the aforementioned patents) connect the constituent components, such as pixels, to a signal storage device, a computer or an electronic display (all also not shown).

When the basic imaging system is exposed to a light source, input light designated by the numeral 1, is collected over an area of lens 2, which in the example of FIG. 1 is the entire surface thereof, and is emitted therefrom as refracted light rays 3. Based upon the characteristics of a lens, the refracted light rays will converge at a series of points that define a posterior focal plane, depicted at 4. The exact three-dimensional shape of focal plane 4 will depend upon the characteristics and shape of lens 2. On the other hand, the three-dimensional shape of photosensor 5 coincides exactly or substantially exactly with focal plane 4. In contrast, in a traditional imaging device, such as the planar two-dimensional array of the prior art, as exemplified in the aforementioned Richardson et al. patent, only a portion of the photosensor intersects with the posterior focal plane.

Photosensor 5 has a shape that coincides with the shape of the posterior focal plane 4 of the optical system such as lens 2. Thus photosensor 5 can be concave, convex, ellipsoidal, flat, irregular, undulating as in a Schmidt lens, or any other shape as determined by an accompanying optical system, to conform to the characteristic posterior focal plane of the optical system. Photosensor 5 is preferably flexible so as to be adjustable to any configuration in the posterior focal plane of the imaging system. Preferably the entirety of photosensor 5 is arranged within the posterior focal plane, occupying substantially all of the posterior focal plane. Furthermore, photosensor 5 can be mounted on a movable plate (not shown), which can either be rigid or have components that are individually movable, so as to adjust to any change in the back focal distance of the imaging system.

Placing photosensor 5 along a contour that coincides with the posterior focal plane is equivalent to wrapping the pixels of a TV screen around the posterior focal plane of its optical system. As a result spherical aberration, coma and astigmatism and other distortions are eliminated. This permits photosensor 5 to meet Abbe's Sine condition so that the image is limited by pure diffraction and the resolution capability of photosensor 5. By placing photosensor 5 along the curve of the posterior focal plane 4, Petzval field curvature and distortion are eliminated since each photosensitive device or CCD constituting photosensor 5 becomes a surface of infinite tangent on the surface so that the distortion accompanying the projection of an image to a flat surface (in particular at the periphery of the image) is eliminated. In effect the photosensitive component parts of photosensor 5 located at the periphery thereof are at the same focal distance as the photosensitive component parts located at the center of photosensor 5. This is not true in conventional electronic imaging devices.

The surface of photosensor 5 can be transparent so that each photosensitive device or CCD element constituting the photosensor can be fine focused with a microscope for better overall definition. This focusing of both the photosensitive devices or CCD elements and the areas between them can be carried out using a computer program that automatically adjusts the focus for maximum resolution and definition by controlling automatic manipulation of a flexible photosensor 5.

Figure 2:
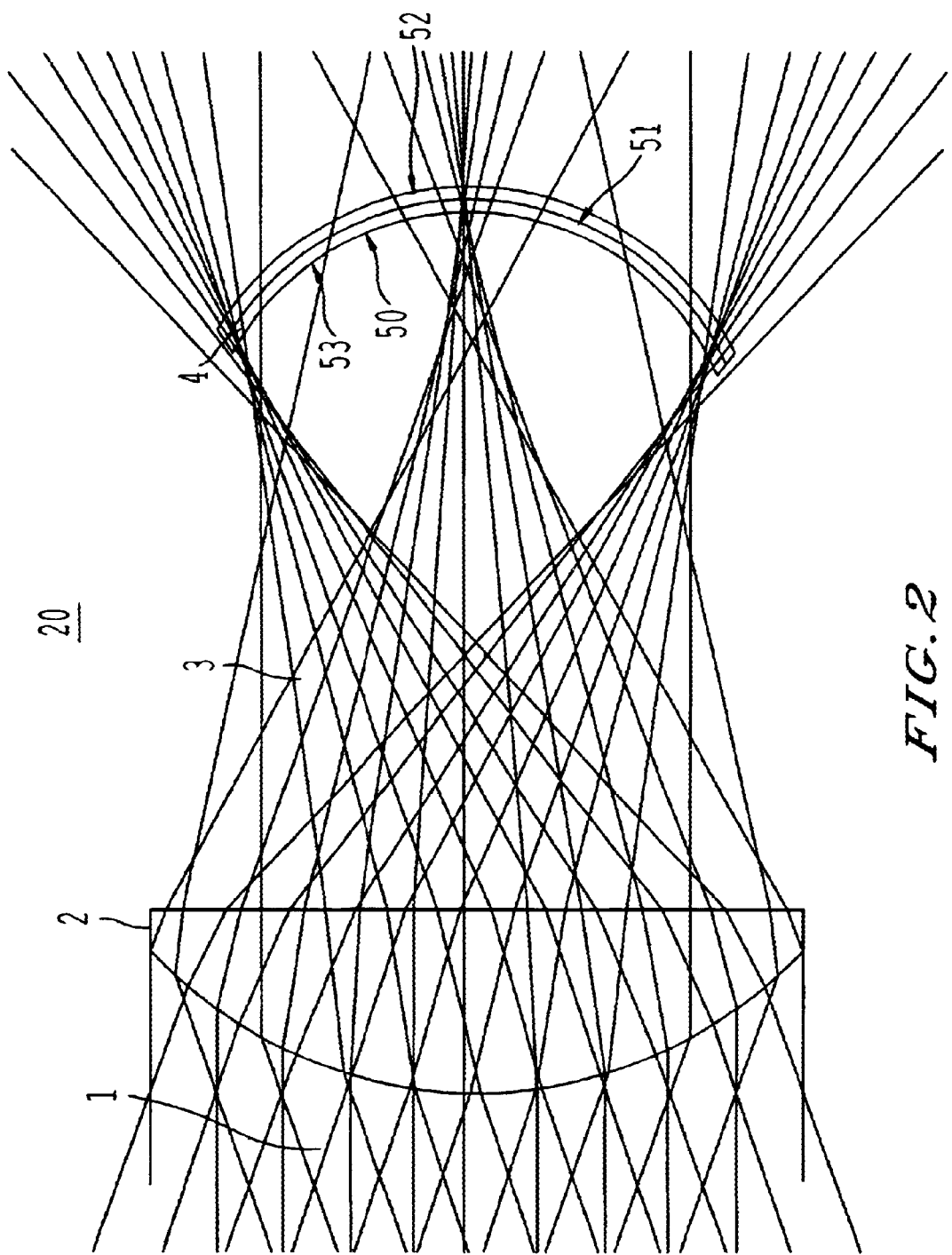
FIG. 2 is a schematic diagram depicting a variation in the arrangement of the device illustrated in FIG. 1.

In the description of the first embodiment of the invention depicted in FIG. 1, the light is preferably monochromatic in order to obtain as sharp a focus as possible because light waves of different colors (i.e. different wavelengths or frequencies) are focused at different points by lens 2. In order to accommodate a multi-chromatic light, a second embodiment of the invention includes a photosensor 50 as depicted in FIG. 2 in order to minimize or eliminate chromatic aberrations. As shown in FIG. 2, photosensor 50 is arranged in three layers 51,52,53 as depicted in FIG. 2, to correct for the different focal distances of red, blue and green light waves. In photosensor 50, at least layers 51 and 52 are transparent so as to allow light to pass unchanged through a layer closer to the light source and to irradiate photosensitive devices or CCD's of the correct color orientation on subsequent layers. The use of multiple layers is merely an extension of the basic focusing arrangement that places photosensitive devices at the posterior focal plane for each wavelength of the various colors of light to be detected. While three layers 51,52, 53 are depicted in FIG. 2, the present invention can encompass a greater number of layers to better locate photosensitive devices for the respective posterior focal planes for a greater number of colors.

Photosensitive film or emulsions can be placed on a surface molded to the posterior focal plane of the lens 2 or other optical system instead of the usual flat plate that is used for traditional photography. This arrangement eliminates lenticular aberrations and increases resolution. The color sensitive elements in the film can be in layers (as depicted in FIG. 2), and molded to fit the posterior focal plane 4 for each color.

To make a photographic film movie one could mold the film emulsion surface to fit the curvature of the posterior focal plane 4 and then mount the curved film emulsion on a standard flat carrier strip, similar to the film strips now in use.

Figure 3:
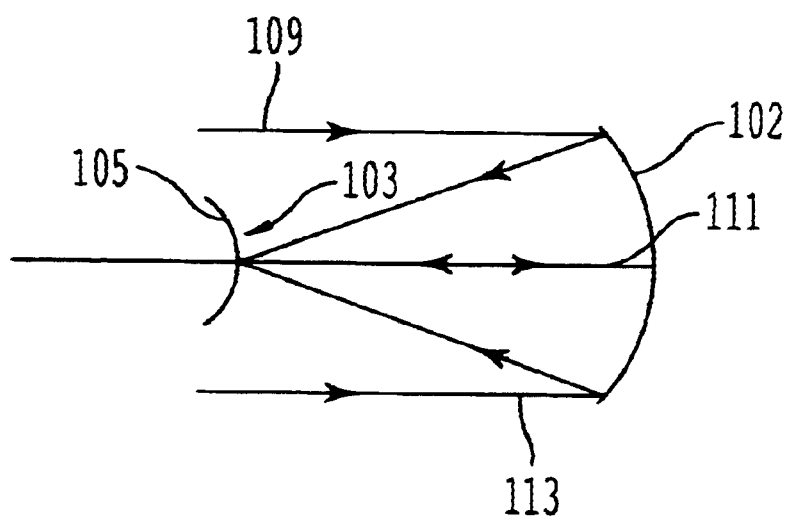
FIG. 3 is a schematic diagram depicting another embodiment of the present invention in which a mirror system is utilized.

A third embodiment of the present invention is depicted in FIG. 3. Whereas the imaging system depicted in FIGS. 1 and 2 was a lens, the imaging system of FIG. 3 comprises only a mirror 102. As depicted in FIG. 3, mirror 102 is a concave mirror having a focal point at 103. Located at focal point 103 is a photosensor 105. All incident light rays, depicted by parallel light rays 109, 111 and 113, impinge mirror 105 and are focused at focal point 107. In order to permit light ray 111 to pass, photosensor 105 can either have a central orifice (not shown) or be comprised of transparent layers, as discussed above with respect to the embodiment depicted in FIG. 1. Because of the laws of optics, the focused image from concave mirror 102 is convex. Thus, photosensor is depicted as having a convex shape. As would be obvious, the imaging, system of FIG. 3 can also be comprised of a lens optically coupled to mirror 102.

Figure 4:
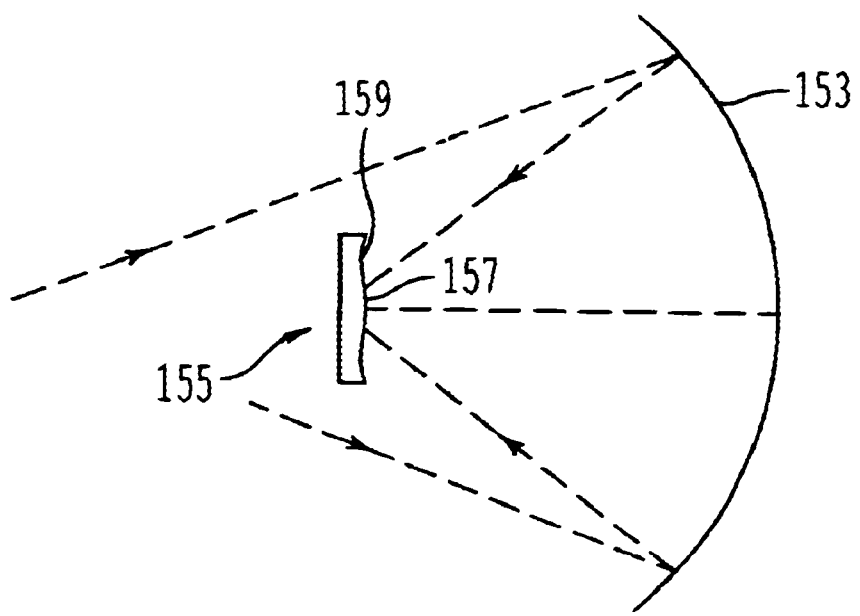
FIG. 4 is a schematic diagram of yet another embodiment of the present invention in which a Schmidt lens system is utilized.

A fourth embodiment of the present invention is depicted in FIG. 4 wherein the imaging system is comprised at least in part of a Schmidt lens or other focusing system (not shown) that produces an undulating or non smooth image at the focal point and a concave or spherical focusing mirror 153. A photosensor 155 having the shape of a Schmidt surface is located at a focal point 157 of mirror 153 so that it compensates as a Schmidt corrector plate. This is an example of molding the focal plane photosensor plane, and such a photosensor would work well with larger focal planes such as those of a telescope to maintain resolution to the periphery of the focusing device. Because an image from a Schmidt lens will have an undulating contour, photosensor 155 has a conforming contour 159 to the formed image.

While a number of embodiments of the present invention have been disclosed by way of example, the present invention is not limited thereby. Rather, the present invention is to encompass all variations, permutations, modifications that are within the scope of the invention. The present invention should be construed to be limited only by the following claims.

I claim:

1. An imaging device, comprising:
   an optical system having a posterior focal area; and
   an irregularly shaped photosensor configured to conform to and substantially occupy said posterior focal area.

2. The imaging device of claim 1, wherein said optical system comprises at least one lens.

3. The imaging device of claim 2, wherein said photosensor array has an arcuate shape so that substantially all of said photosensor is arranged within, and occupying substantially all of, said posterior focal area.

4. The imaging device of claim 3, wherein said arcuate shape is concave with respect to said at least one lens; and wherein said lens is circular.

5. The imaging device of claim 3, wherein said curve is convex with respect to said at least one lens; and wherein said lens is circular.

6. The imaging device of claim 3, wherein said photosensor comprises a plurality of discrete photosensing devices.

7. The imaging device of claim 3, wherein said photosensor comprises at least one charge coupled device.

8. The imaging device of claim 3, wherein said photosensor comprises a plurality of liquid crystal devices.

9. The imaging device of claim 3, wherein said photosensor comprises a photo-sensitive chemical emulsion.

10. The imaging device of claim 3, wherein said photosensor comprises a plurality of layers, where each of said layers is positioned at an optimum distance from said at least one lens for receiving a particular wavelength of light.

11. The imaging device of claim 10, wherein individual ones of said layers are positioned for optimally receiving a corresponding one of a red, a blue and a green light wavelengths.

12. The imaging device of claim 10, wherein at least one of said layers is transparent.

13. The imaging device of claim 1, wherein said photo sensor is transparent.

14. A method of compensating for distortion in an imaging system having an optical system and an irregularly shaped photosensor, said method comprising the steps of:
   (a) inputting a plurality of light rays to said optical system over an area of said optical system;
   (b) diffracting each of said input light rays from said area of said optical system; and
   (c) transmitting each of said diffracted light rays to one of a plurality of photosensor devices located at a plurality of irregular posterior focal points corresponding to said area of said optical system.

15. The method of claim 14, further comprising the step of:
   (d) converting said light; rays at each said posterior focal point into electrical signals indicative of characteristics of said input light rays.

16. The method of claim 14, further comprising the step of:
   (e) carrying out a chemical conversion of a photographic emulsion at each said posterior focal point.

17. The method of claim 15, further comprising the step of:
   (f) adjusting said photosensor device at each said posterior focal point for maximum resolution of said difracted light rays impinging on each said posterior focal point.

18. The imaging device of claim 1, wherein said photosensor is flexible.

19. The imaging device of claim 1, wherein said optical system comprises a Schmidt lens.

20. The imaging device of claim 1, wherein the optical system further comprises at least one of a concave focusing mirror and a spherical focusing mirror.

* * * * *